Figure 1:
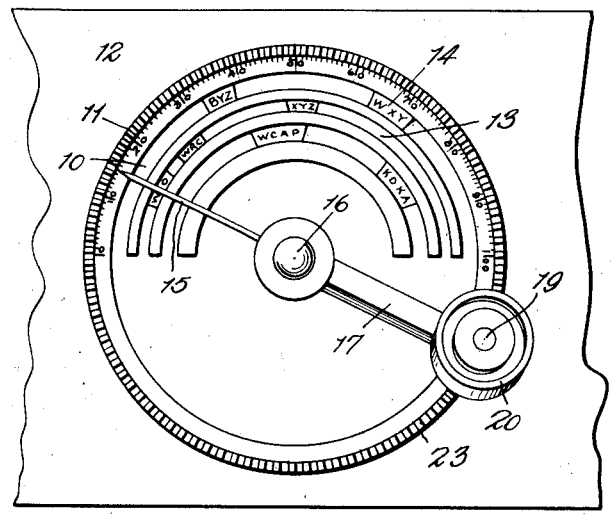

Sept. 14, 1926.

W. J. SPIRO

RADIO TUNING DIAL

Filed June 15, 1925

1,599,498

Inventor
Walter J. Spiro
By Alfred T. Gage
Attorney

Patented Sept. 14, 1926.

1,599,498

UNITED STATES PATENT OFFICE.

WALTER J. SPIRO, OF WHITE PLAINS, NEW YORK.

RADIO TUNING DIAL.

Application filed June 15, 1925. Serial No. 37,192.

This invention relates to a radio tuning dial and particularly to means for effecting a coarse and fine adjustment of an indicating pointer by a single actuating member in the regulation of a radio receiving instrument for different wave lengths.

Under present conditions in many instances these wave lengths have only a relatively slight difference and it is often difficult to accurately adjust a receiving instrument for continuous and satisfactory reception. In my patent for wavelength indicator No. 1,523,305 dated January 18, 1925, a form of such an adjusting device was shown but it has been practically found that neither the use of cooperating frictional surfaces nor meshing geared teeth give a sufficiently fine vernier feed to meet all conditions of use. In the patent mentioned when the parts were at rest or the instrument operating, the frictional adjuster was out of contact with the dial and liable to be accidentally displaced, which would destroy the tuning already secured, and there was no means for holding the pointer at its adjusted position. In the patent the adjuster must be held under tension in the engaged position which materially reduces the certainty of accurate adjustment due to the physical liability of a slight variation in pressure or even unconscious movement of the hand.

These objections have been overcome by retaining the adjuster in normal contact with the dial so that its position is held against displacement and always ready for further adjustment by a simple rotative movement which being transmitted through the enlarged spiral thread is not affected by movement or trembling of the operator's hand. By withdrawing this thread from the cooperating tooth the dial pointer is free for coarse adjustment, for instance into alinement with one of the station indicators which give the general position, and the vernier feed to secure the finer wavelength is effected by reengagement of the thread with the teeth.

The invention has for an object to provide a novel and improved construction embodying a dial having graduations and a toothed face in connection with a pointer carrying an adjuster having a spiral thread in engagement with said teeth, whereby a fine wavelength adjustment may be secured and retained.

A further object of the invention is to present a new form of dial and cooperating pointer mounted upon a control shaft and carrying feed means normally held in contact with teeth upon the dial.

Another object of the invention is to provide an improved construction of pointer handle carrying a yieldingly mounted adjuster shaft having a disk end with a spiral thread of large diameter adapted to engage a series of star teeth carried by a cooperating graduated dial.

Other and further objects and advantages will be hereinafter set forth and the novel features of the invention defined by the appended claims.

In the drawing—

Figure 2:
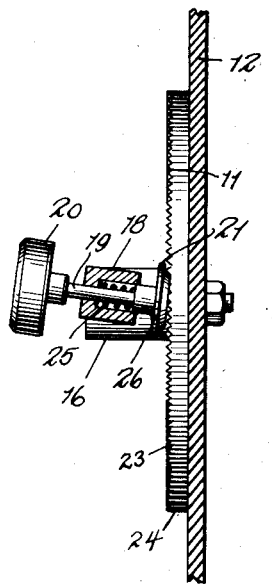
Figure 4:
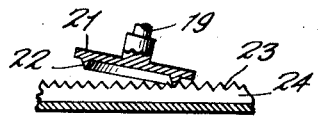
Figure 3:
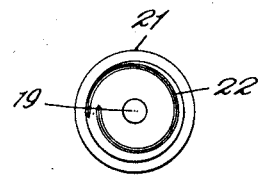

Figure 1 is an elevation of the invention;
Figure 2 is a side view thereof;
Figure 3 is an enlarged detail of the adjuster; and
Figure 4 is a bottom plan of the spiral disk.

Like numerals refer to like parts in the several figures of the drawing.

The invention is applicable to various forms of tuning dials and is herein shown in connection with a wavelength indicator, as in my Patent No. 1,523,305 before mentioned, where the dial 10 is provided with the usual graduations 11 and secured to an instrument panel 12. In this form the dial is provided with a plurality of concentric slideways or tracks 13 adapted to receive adjustable station indicators 14 which cooperate with a pointer blade 15 carried by the shaft 16 of a variable condenser or other tuning instrument.

The shaft 16 is also provided with a handle member 17 formed at its free end with a socket 18 to receive an adjusting shaft 19 which carries at its outer end a knob 20. The opposite end of the adjusting shaft 19 has secured thereon a disk 21 having upon its under face a spiral thread 22 of considerable diameter which is adapted to engage a tooth 23 upon the rim 24 surrounding the dial or a segment thereof. The teeth of this rim are preferably of the saw or star type having opposite walls extending at substantially the same angle which permits the use of a large number of fine teeth and materially increases the vernier effect in adjustment. The rim may be formed as part of the dial or independent thereof and is disposed with its toothed edge at practically a right angle to the face plane of the dial. In order to present the vernier feeding thread in engagement with a single tooth the disk carrying the same is arranged at an angle to the vertical, while the convolution or pitch of the thread is such that a ratio of 150 to 1 may be secured and a complete revolution of the knob is necesary to advance the dial pointer one tooth.

It is also been found of practical importance to retain the adjuster in contact with the dial or disk under normal conditions which prevents accidental displacement and leaves the parts when at rest in position for immediate fine adjustment. This result may be accomplished by means of a spring 25 with the socket of the handle and bearing against a shoulder 26 on the adjuster shaft or stem 19.

The general operation of the invention will be understood from the foregoing description and with the parts in the position shown the adjuster is held against displacement but capable of immediate vernier feed to perfect a tuning adjustment. In first reaching such an adjustment the feeding thread is released from the dial and the pointer moved into alinement with the desired station indicator when the thread is again engaged with the teeth and the final adjustment effected. The construction thus presents a simple, efficient and economically manufactured tuning device adapted to secure both a coarse and fine adjustment by the manipulation of a single handle member.

While the details of the invention have been shown and described, the invention is not confined thereto, as changes and alterations may be made therein without departing from the spirit of the invention as defined by the following claims.

What I claim is—

1. In a radio tuning device, an indicator comprising a fixed member having a curved toothed face, a shaft carrying a movable member, and an engaging thread upon the movable member operable transversely of said face to effect a circumferential travel of the movable member and normally held in yielding contact with said face for fine adjustment but freely separable therefrom for gross adjustment of the movable member.

2. In a radio tuning device, an indicator comprising fixed and movable members, a shaft carrying the movable member, a toothed face disposed at the fixed member, an adjusting means carried by said shaft and having a contact thread of relatively large convolution engaging a single tooth of said face, and means for yieldingly retaining said thread in contact with a tooth of the face.

3. In a radio tuning device, an indicator comprising fixed and movable members, a shaft carrying the movable member, a toothed face disposed at the fixed member, an operating handle upon the shaft, and an adjusting stem having a feeding thread tensioned to normally engage the teeth and freely reciprocable toward and from the same.

4. In a radio tuning device, a dial provided with indications, a shaft carrying a cooperating pointer, a toothed face upon the dial, a handle on said shaft, an adjuster mounted on the handle and having a face provided with a thread of relatively large convolution movable in a curved path transversely of said toothed face to effect a material difference in the ratio of movement of said faces, and tension means for normally retaining the threaded and toothed faces in contact.

5. In a radio tuning device, a dial provided with indications, a shaft carrying a cooperating pointer, a curved star toothed face disposed at an angle to the face plane of the dial, an operating handle upon the shaft, an adjusting stem rotatably and reciprocably mounted in said handle, and a single spiral thread upon said stem disposed to engage a tooth of said face.

6. In a radio tuning device, a dial provided with indications, a shaft carrying a cooperating pointer, a toothed face disposed at an angle to the face plane of the dial, an operating handle upon the shaft, an adjusting stem rotatably mounted therein, a disk on said stem having a curved thread disposed to rotate in a path at an angle to the toothed face, and tension means for normally engaging the thread and toothed face.

7. In a radio tuning device, a dial provided with indications, a shaft carrying a cooperating pointer, a toothed face upon said dial, an operating handle upon the shaft having a socket at its outer end, an adjusting spindle extending through said socket and formed with a shoulder, a spring within a socket bearing on said shoulder, a disk at the inner end of the spindle, and an enlarged spiral thread thereon held by said spring in normal contact with the toothed face.

8. In a device of the class described, a reducing gear comprising a toothed member, a driven shaft provided with a movable member, a shaft carried by the movable member substantially parallel to the driven shaft and provided with a spiral device, and means for holding said toothed member and device normally in contact but permitting free separation thereof.

In testimony whereof I affix my signature.

WALTER J. SPIRO.